Sept. 1, 1942.  N. P. LARSEN ET AL  2,294,757
WINCH
Original Filed Feb. 16, 1938   2 Sheets-Sheet 1

INVENTORS
NEIL P. LARSEN and
BY   HERMAN J. TROCHE
Bates, Teare, & McBean
ATTORNEYS Sept. 1, 1942.  N. P. LARSEN ET AL  2,294,757
WINCH
Original Filed Feb. 16, 1938    2 Sheets-Sheet 2

INVENTORS
NEIL P. LARSEN and
BY HERMAN J. TROCHE
Bates, Teare, & McBean
ATTORNEYS Patented Sept. 1, 1942

2,294,757

UNITED STATES PATENT OFFICE 2,294,757

WINCH

Neil P. Larsen and Herman J. Troche, Cleveland, Ohio, assignors to The American Coach & Body Company, Cleveland, Ohio, a corporation of Ohio Original application February 16, 1938, Serial No. 190,760, now Patent No. 2,282,731, dated May 12, 1942. Divided and this application March 1, 1940, Serial No. 321,647

1 Claim. (Cl. 254—166)

This invention relates to power winches, and particularly the type adapted to be mounted on a motor vehicle and operated by the vehicle motor for transferring a load to or from the vehicle. The present application is a division of our co-pending application, Serial No. 190,760, filed February 16, 1938, now Patent No. 2,282,731, issued May 12, 1942.

The principal object of the invention covered by this application is the provision of a winch supporting structure that will permit the drum and speed reducing mechanism to be adjusted as a unit with reference to the frame of the vehicle until the best position is obtained for making a driving connection to the motor, after which the unit may be securely fastened to the vehicle frame.

An additional feature of the invention covered by the present application is the arrangement of a supporting framework for the hoisting drum whereby the drum and its associated mechanism may be supported on the vehicle in a much lower position than hitherto was possible with known types of supporting structure, and wherein the drum and its associated speed reduction mechanism can be shifted as a unit transversely of the vehicle to suit the requirements of any installation.

Figure 1:
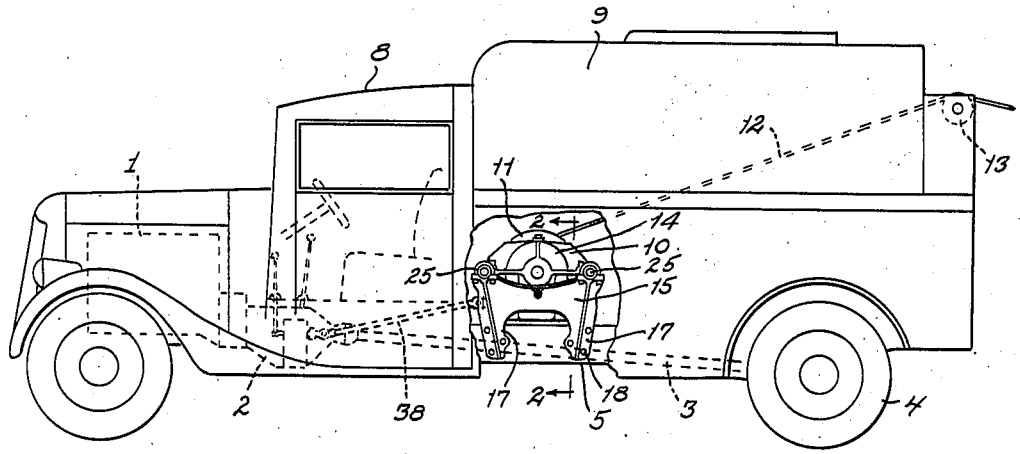
Figure 2:
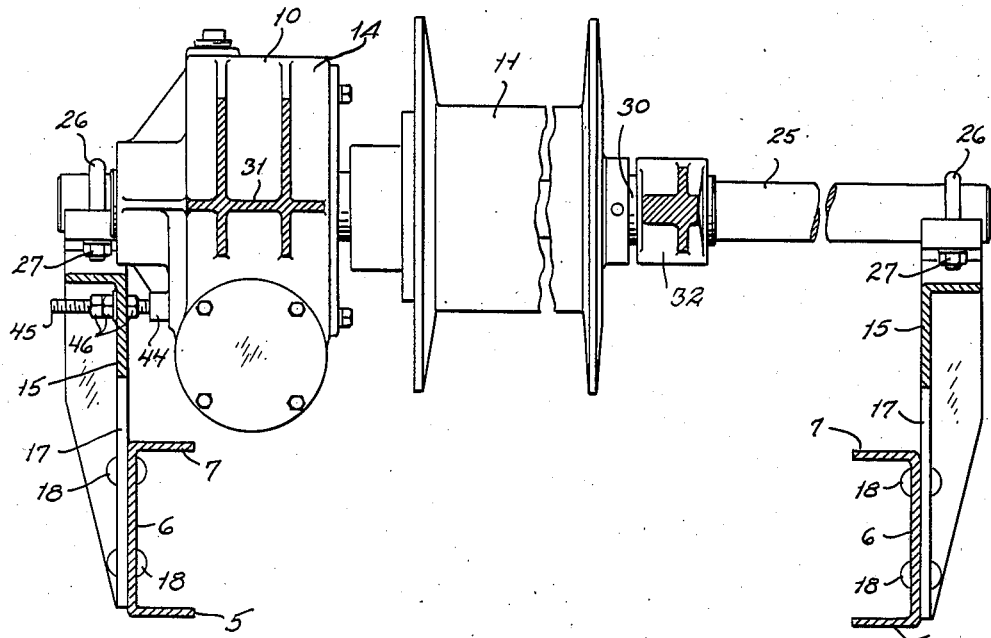
Figure 3:
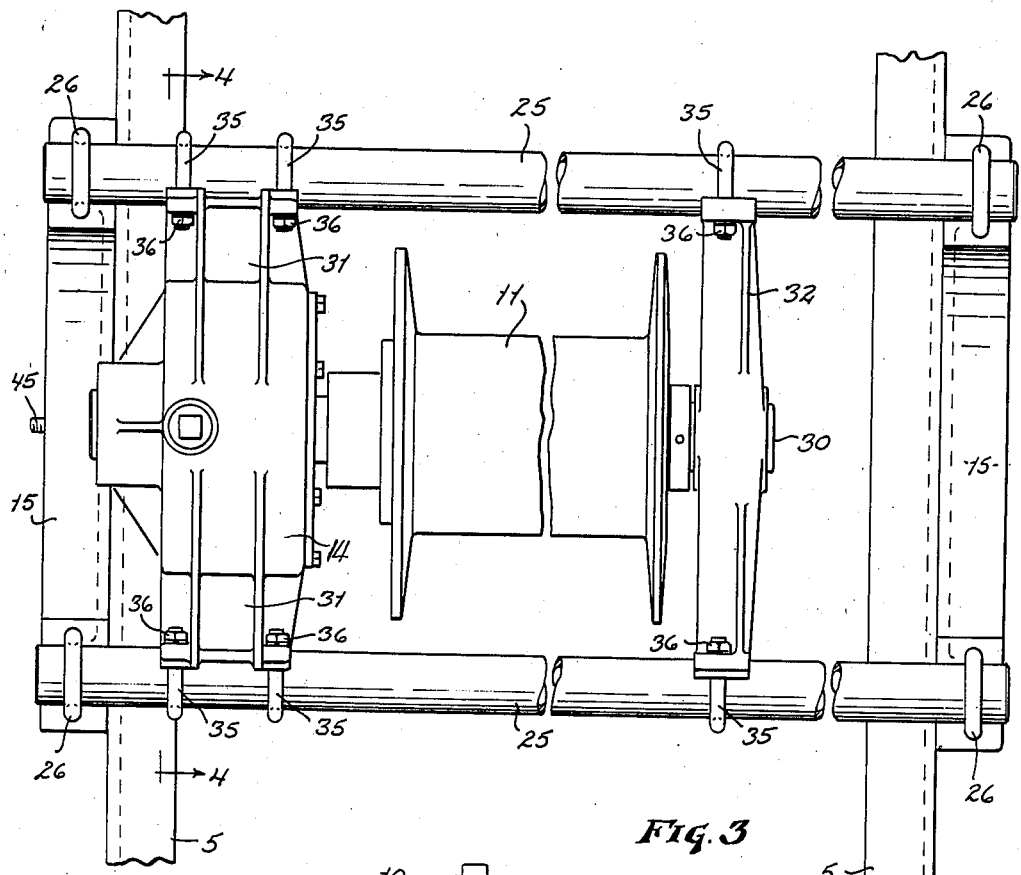
Figure 4:
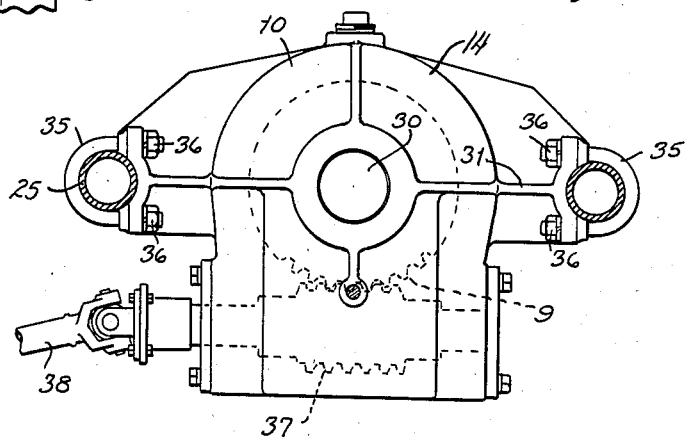

Referring now to the drawings, Fig. 1 is a side elevation of a motor vehicle partly broken away to show the winch; Fig. 2 is a section taken on the line 2—2 in Fig. 1; Fig. 3 is a fragmentary plan view on a scale larger than that shown in Fig. 1 and illustrating the winch mechanism and its supporting framework, and Fig. 4 is a section taken on the line 4—4 in Fig. 3.

Referring to Fig. 1, the vehicle shown is of the automobile type having an internal combustion motor 1, a change speed mechanism 2 and the usual driving connections including a propeller shaft 3 leading to a set of traction wheels 4. The chassis includes the usual longitudinal frame members or sills 5, a portion of which are shown in Figs. 1 and 2 with vertical webs 6 and horizontal flanges 7. The driver's cab is indicated at 8, while a covered load-carrying body, open at the rear, is designated 9, and is adapted to carry tools and materials incident to installing and servicing electric transmission lines.

The winch mechanism indicated generally at 10 is shown as being located within and near the forward portion of the body 9 behind the driver's cab, and as comprising a gear reduction unit 14, and a single winding drum 11 which is illustrated as having a cable 12 extending rearwardly as over a guiding sheave 13 which is supported at the upper rear portion of the body.

The winch mechanism may be supported as a unit by upright hanger brackets 15 which are provided with leg portions 17 that are adapted to be fastened in face to face contact with the web portions 6 of the vehicle sills. The fastening means between the brackets and sills illustrated in the drawings may comprise rivets 18, the openings for which are located in the brackets after the winch has been adjusted for the desired height and inclination with reference to the vehicle.

The hanger brackets support relatively light but stiff cross frame bars 25 which are shown in the form of tubes which extend from one frame sill 5 to the other, and which may be attached to the hanger brackets, as by U-bolts 26 and nuts 27. The winch mechanism thus forms a unit with the tubes 25 which may be adjusted laterally of the vehicle to suit the requirements of any particular vehicle.

The winding drum 11 may be supported upon a shaft 30 which is journalled in two cross members 31 and 32 and these, in turn, are adapted to be fastened to the tubes 25 by means of U-bolts 35 and nuts 36. The cross member 31 may comprise a housing for a gear reduction unit, one member 37 of which is adapted to be connected to the vehicle motor by the driving connection 38. This supporting structure enables the axis of the drum shaft to be positioned in substantially the same plane as the axes of the tubes 25, thereby keeping center of gravity of the winch as low as possible on the vehicle.

The housing 31 may have an adjustable stabilizing connection with one of the hanger brackets, such as shown in Fig. 2, where a stud 45 is threaded into a boss 44 on the housing, the stud having a threaded portion extending through the vertical web of the hanger bracket 15 and secured, as by an adjusting and securing nut 46, on one or both sides of it.

The supporting structure illustrated enables the winch and its associated speed reduction mechanism to be adjusted as a unit, until the desired inclination with the vehicle frame is obtained, after which it is fastened securely thereto by the members 18. Moreover, it may be adjusted transversely of the vehicle to suit the requirements of any particular vehicle. This arrangement has a two-fold purpose; first, it enables the gear reduction driving member to be positioned relatively low, where it can readily be connected to a power take-off device from the motor, and second, it keeps the center of gravity of the operating mechanism as low as possible without interfering with any of the necessary operating mechanism for the vehicle.

We claim:

In a motor truck, the combination of a chassis frame, winch-supporting mechanism, including spaced brackets attached to the chassis frame, transverse guide bars attached to said brackets, a winch comprising a winding drum and reduction gearing, a pair of hanger brackets supporting the winch and adjustably mounted on said transverse bars, one of said hanger brackets being formed into a housing about the reduction gearing, said housing extending adjacent to one of the chassis brackets, and means for locking the housing to such bracket, said means being operative to permit adjustment of the winch along the guide bars.

NEIL P. LARSEN.
HERMAN J. TROCHE.